United States Patent
Koons

(10) Patent No.: US 7,162,440 B2
(45) Date of Patent: Jan. 9, 2007

(54) PRODUCT MANAGEMENT SYSTEM

(75) Inventor: Rodney Koons, Mooresville, IN (US)

(73) Assignee: National Notification Center LLC, Indianapois, IN (US)

( * ) Notice: Subject to any disclaimer, the term of this patent is extended or adjusted under 35 U.S.C. 154(b) by 820 days.

(21) Appl. No.: 10/011,818

(22) Filed: Nov. 12, 2001

(65) Prior Publication Data

US 2003/0093328 A1 May 15, 2003

(51) Int. Cl.
G06F 17/60 (2006.01)
(52) U.S. Cl. ............................. 705/26; 705/22; 705/28; 340/5.9
(58) Field of Classification Search .................. 705/22, 705/26, 28; 340/5.9, 573.1
See application file for complete search history.

(56) References Cited

U.S. PATENT DOCUMENTS

| | | |
|---|---|---|
| 4,958,280 A | 9/1990 | Pauly et al. |
| 4,967,906 A | 11/1990 | Morello et al. |
| 5,042,686 A | 8/1991 | Stucki |
| 5,178,419 A | 1/1993 | Bolnick et al. |
| 5,257,741 A | 11/1993 | Rode et al. |
| 5,533,079 A | 7/1996 | Colburn et al. |
| 5,628,530 A | 5/1997 | Thornton |
| 5,712,989 A | 1/1998 | Johnson et al. |
| RE35,743 E | 3/1998 | Pearson |
| 5,737,539 A | 4/1998 | Edelson et al. |
| 5,803,499 A | 9/1998 | Tung et al. |
| 5,823,948 A | 10/1998 | Ross, Jr. et al. |
| 5,898,586 A | 4/1999 | Jeatran et al. |
| 5,961,151 A | 10/1999 | Tung et al. |

(Continued)

FOREIGN PATENT DOCUMENTS

JP 59-49659 3/1984

OTHER PUBLICATIONS

Junger, Peter; Saving Face. (SiRAS.com assists in managing product returns)(Brief Article); The Business of CE Retailing, v43, n9, p. 58, Sep. 2001.*

Primary Examiner—Elaine Gort
(74) Attorney, Agent, or Firm—Bose McKinney & Evans LLP

(57) ABSTRACT

A system and method for processing product movement requests including orders and returns while maintaining a real-time accounting of product locations includes a network, a first communication link connecting a first location to the network, a second communication link connecting a second location to the network, and an information manager coupled to the network. The information manager includes a database of product information. The information manager responds to a product order from the first location by sending an order acknowledgement confirmation message over the network to the first location, causing the second location to send an order acknowledgement card and the ordered product to the first location, and updating the database to indicate that the ordered product was received by the first location upon return receipt of the order acknowledgement card. The information manager also responds to a request to return product from the first location by sending a return confirmation message over the network to the first location, sending a return acknowledgement card to the first location, and updating the database to indicate that the return product was received by the second location upon return receipt of the return acknowledgement card and receipt of the returned product at the second location. The information manager thus tracks the movement and last known location of the products and maintains in the database a confirmed last known location for each product in the system.

25 Claims, 2 Drawing Sheets

U.S. PATENT DOCUMENTS

| | | |
|---|---|---|
| 6,003,006 A | 12/1999 | Colella et al. |
| 6,018,719 A | 1/2000 | Rogers et al. |
| 6,021,392 A | 2/2000 | Lester et al. |
| 6,047,259 A | 4/2000 | Campbell et al. |
| 6,055,507 A | 4/2000 | Cunningham |
| 6,056,322 A | 5/2000 | Lupi |
| 6,208,974 B1 | 3/2001 | Campbell et al. |
| 6,249,774 B1 | 6/2001 | Roden et al. |
| 6,536,659 B1 | 3/2003 | Hauser et al. |
| 2001/0037248 A1* | 11/2001 | Klein .......... 705/22 |
| 2002/0010689 A1 | 1/2002 | Tibbs et al. |
| 2002/0019785 A1 | 2/2002 | Whitman |
| 2002/0073170 A1* | 6/2002 | Hoffman et al. ........ 709/217 |
| 2002/0138356 A1 | 9/2002 | Dutta et al. |

* cited by examiner

PRODUCT MANAGEMENT SYSTEM

FIELD OF THE INVENTION

The present invention generally relates to systems for managing product movement and more specifically to a system for processing product orders and returns while maintaining a real-time accounting of product location.

BACKGROUND OF THE INVENTION

Many companies, which sell or distribute product find it advantageous to reliably account for successful order fulfillment and product returns. More specifically, for many types of products, it is desirable to maintain an accurate inventory of product, both at the product destination location and the product source. It is further desirable to periodically reconcile the physical inventories of product against the product shipping records to detect product diversion, loss, or theft.

While the method and system of the present invention are applicable to virtually any product sales or distribution network, the following disclosure will use, as an example, a pharmaceutical sample distribution network. Distribution of pharmaceutical samples is a regulated activity, governed under the Prescription Drug Marketing Act ("PDMA"). The PDMA requires drug manufacturers and marketing organizations to periodically account for products manufactured and distributed, for example, as samples to physicians. By requiring this accounting, the PDMA seeks to reduce the quantity of prescription drugs diverted to the black market. Accordingly, it is required that each product governed by the PDMA be tracked from its source to its destination. Periodically, organizations falling under the purview of the PDMA must provide an accurate accounting of the location and/or final disposition of the products in their system. Final disposition may include delivery to a physician, or destruction of the product because the product was not used before its expiration date.

Presently, pharmaceutical companies use multiple systems for product distribution, return, and tracking. The process of product reconciliation is largely manual, requiring the pharmaceutical company to access information in its ordering system for drug representatives, its shipping and tracking systems, and its return system. This lengthy and tedious process for determining the location and disposition of hundreds of thousands of products makes frequent, system-wide reconciliation difficult.

SUMMARY OF THE INVENTION

The present invention provides a centralized system for processing product movement requests, including orders and returns, while maintaining a real-time accounting of product locations. The system generally includes a central network, which is accessible by sales representatives, for example, or other personnel at product destination locations. The network is further connected to product source locations such as fulfillment centers, warehouses, or drug manufacturing facilities. Finally, a product management service provider is connected to the network, the product source locations, and the product destination locations. The product management service provider includes an information manager, which may include, for example, a central computing system or central processor and an information database. The information manager responds to product orders from destination locations by sending order confirmation messages via e-mail over the network to the destination location. Such confirmation messages include a confirmation of the quantity of ordered product, the method of delivery, and a tracking number for use by personnel at the destination location in tracking the product shipment. The information manager automatically communicates the product order to the appropriate source location and causes the generation of an order acknowledgement card and shipping labels to accompany the ordered product to the destination location. When the product is picked up at the source location by, for example, a parcel carrier, the information manager accesses the parcel carrier tracking system and updates the product database to indicate that the ordered product is en route to the destination location. When the product is delivered to the destination location, personnel at the destination location complete the order acknowledgement card and mail it to the product management service provider. Upon receipt of the signed, order acknowledgement card, the information manager updates the product database to indicate that the ordered product was received by the destination location.

Similarly, the information manager responds to requests to return product from a return source location by sending a return confirmation message via e-mail over the network to the return source location. The return confirmation message also includes a description and the quantity of the product to be returned, the method of delivery, and a return tracking number. The information manager also causes the generation of a return acknowledgement card and return shipping labels, which are mailed to the return source location. Upon the receipt of the labels and the return acknowledgement card, personnel at the return source location package the product, fill out the return acknowledgement card, and provide the returned product to, for example, a parcel carrier. When the product is picked up by the carrier, the information manager accesses the tracking system of the carrier and updates the product database to indicate that the returned product is en route to its return destination location. The returned product is received by a processing center at the product management service provider. Upon receipt of the signed, return acknowledgement card, the information manager updates the product database to indicate that the returned product was received at the processing center. At any point during processing of product movement requests, the information manager may access the product database to generate a reconciliation report in real-time which reflects the last known location and status of any product in the system.

These and other features of the present invention will become more apparent, and the invention better understood upon a review of the following description and the accompanying drawings.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention.

Figure 1:
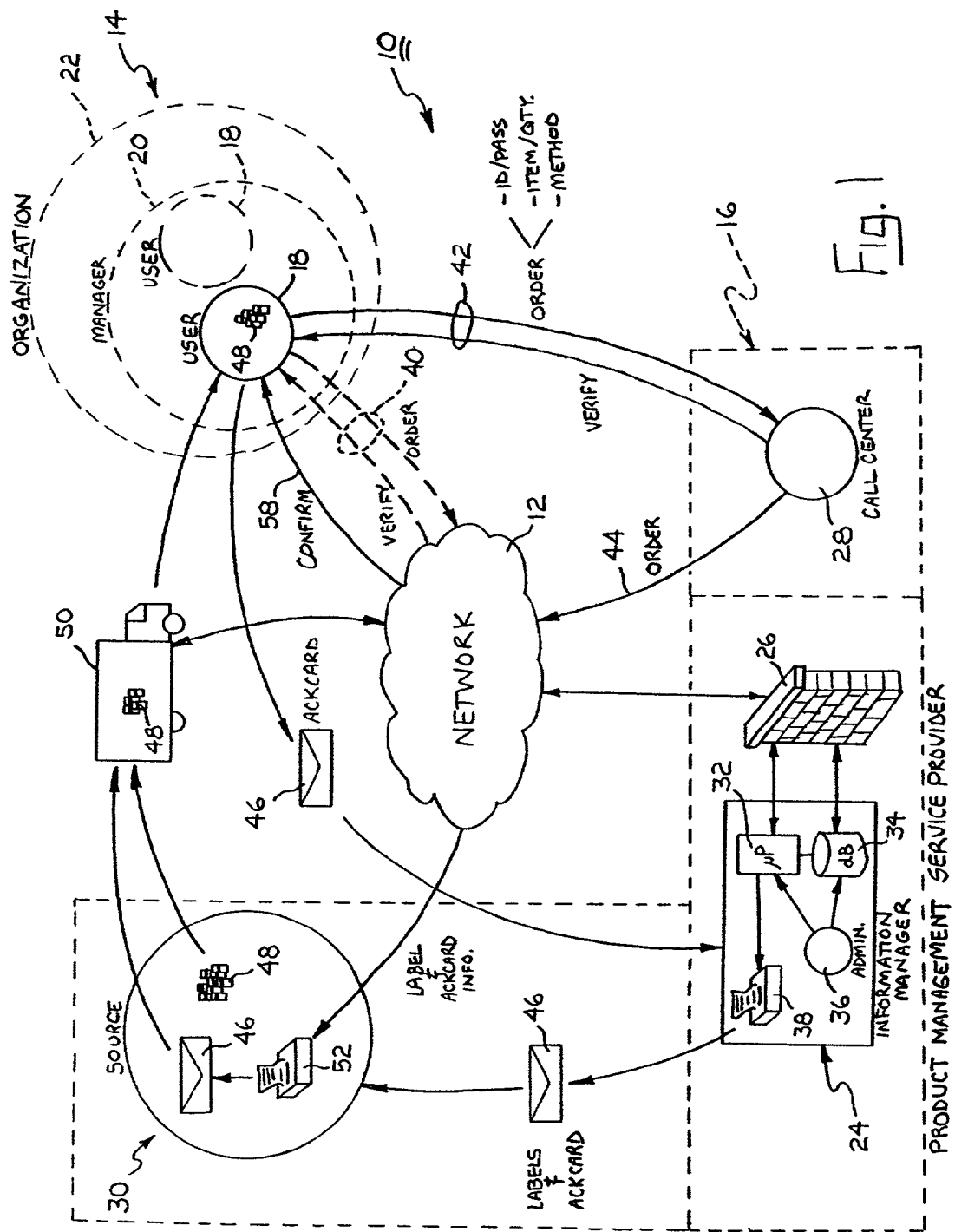
FIG. 1 is a conceptual diagram of a system according to the present invention reflecting the process of ordering product, fulfilling the product order, and tracking the location of the ordered product.

FIG. 1 shows a system according to the present invention, generally designated by the numeral 10. System 10 generally includes a network 12, a product destination location 14, and a product management service provider 16. Network 12 may be any suitable network, such as the internet, which provides a system for communication between various components of system 10. As will be further described below, destination location 14 may be a user 18 of system 10, such as a pharmaceutical sales representative. As indicated in FIG. 1, multiple users 18 may access system 10, but for purposes of this example, a single user 18 is described. If multiple users 18, such as pharmaceutical sales representatives, access system 10, these multiple users 18 (or bottom-level users) are frequently under the supervision of a manager 20 (or mid-level user) who may also access system 10 to obtain product information relating to the multiple users 18. Similarly, multiple managers 20 frequently fall under the supervision of top-level personnel within an organization 22. The distinctions between various entities (users 18, managers 20, and organizations 22) and their ability to access information in system 10 will be further described below.

Product management service provider 16 includes an information manger 24 which is connected through a firewall 26 to network 12. As indicated by the dashed lines in FIG. 1, product management service provider 16 may also include a call center 28 and a product source location 30. However, as should become more apparent upon a reading of the description below, both call center 28 and product source location 30 may be physically separate from information manager 24, and not a part of product management service provider 16.

Information manager 24 includes a central processor 32 and an information database 34. It should be understood that central processor 32 and database 34 may be part of the same central computer system which may be implemented using a variety of different types of hardware. Database 34 may be configured as a data warehouse separate from processor 32 such that the processing facilities of processor 32 are not taxed by the frequent generation of reconciliation reports, or the frequent updating of product location information as further described below. In the event that a data warehouse configuration is employed, information manager 24 shall be capable of replicating the data warehouse at the completion of a product movement request. Information manager 24 also includes, in addition to other personnel, system administrators represented by the numeral 36, and an optional on-site printing facility 38. It should be understood, however, that information manager 24 may outsource print jobs to an external printing facility connected to information manager 24 by network 12.

Product Orders

In one example, a product order may include the steps described below. A product order may be initiated by a user 18, such as a pharmaceutical sales representative. User 18 may access system 10 to place the order over a direct connection to network 12 as indicated by the numeral 40. Alternatively, user 18 may place the order by telephone via a call to call center 28. As indicated above, call center 28 may be physically located at product management service provider 16 or located external to product management service provider 16, for example, within organization 22. Assuming user 18 places the order by telephone to call center 28 over a conventional telephone link 42, call center 28 accesses network 12 over communication link 44. The call center personnel handling the call obtains from user 18 an identification number and password associated with user 18. Prior to obtaining access to any product information in database 34, or information such as the address and telephone number of user 18, the call center personnel must input the user's identification number and password which information manager 24 compares to identification number and password associated with user 18, stored in database 34. If the identification number and password match, call center 28 may access product information in database 34 and identification information associated with user 18 via network 12. User 18 provides the type of product desired, the quantity and the method of shipping such as any one of a number of shipping options provided by public parcel carriers. Call center 28 verifies the product order and quantity, and the method of shipping. When user 18 confirms this information, call center 28 transmits the order on communication link 44 over network 12 to information manager 24.

In the event user 18 desires to order directly from information manager 24, user 18 logs into system 10 by accessing network 12 and providing an identification number and password using, for example, a personal computer or personal digital assistant connected to network 12 over a communication link 40. A typical interface between user 18 and information manager 24 is a website accessible using network 12. Software run by processor 32 prompts user 18 for order information (including product type, quantity, and method of shipping), and automatically prompts user 18 to verify the order.

In either case, information manager 24 responds to the order by transmitting a confirmation message in the form of an e-mail message to user 18. The confirmation message includes the ordering information as well as an order tracking number which is associated with the order to enable the user to access system 10 and determine the last known location of the order prior to its arrival at the destination location, in this case, the address of user 18.

In this example, product source location 30 is assumed to be external from product management service provider 16. Accordingly, processor 32 transmits the order information to printer 38 which prints product shipping labels and an order acknowledgment card as indicated by item 46 in FIG. 1. These materials are mailed to product source location 30. In the alternative, upon receipt of the order information, product manager 24 may transmit information required to generate shipping labels and an order acknowledgement card to source location 30 over network 12. A printer 52 at source location 30 then generates the shipping labels and order acknowledgement card 46. Upon receipt of the labels and order acknowledgement card 46, personnel at source location 30 package product 48 according to the ordering information. Product 48 and order acknowledgement card 46 are next picked up at source location 30 by, for example, a parcel carrier indicated by item 50. Typically, the labels generated by information manager 24 will include a bar code. Accordingly, when parcel carrier 50 loads product 48 at source location 30, the parcel carrier personnel scan the packaged product and upload this information to a tracking system maintained by parcel carrier 50. Information manager 24 is connected to parcel carrier 50 through network 12 and obtains the scanned information indicating that ordered product 48 has been picked up at source location 30. Processor 32 updates database 34 to indicate that ordered product 48 is en route to user 18.

When product 48 is delivered to user 18, user 18 fills out order acknowledgement card 46 verifying that the ordered product 48 successfully reached user 18. Personnel at user 18 must sign acknowledgement card 46 and mail acknowledge card 46 to product management service provider 16. Upon receipt of a signed, order acknowledgement card 46 from user 18, information manger 24 updates product database 34 to add the ordered quantity of product 48 to the inventory of user 18.

According to another feature of the invention, the information stored in database 34 is segregated into user accounts which may be accessed by various types of users according to their user role. For example, information manger 24 is configured such that data relating to multiple organizations 22 may be simultaneously maintained. However, for a variety of reasons, it is desirable that access to product information and other business related information is restricted to users having a need to access such information. In the example of a pharmaceutical sales organization, a top-level user is granted access to essentially all of the information that is stored in database 34 associated with organization 22. A top-level user may access the information and change or configure certain system options related to the method of doing business with organization 22. For example, a top-level user may access and check the status of all product associated with the various managers 20 (or mid-level users), within organization 22. Similarly, managers 20 have access rights to system 10 which enable the managers 20 to access information in database 34 associated with the bottom-level users (users 18) under the supervision of the particular manager 20. Likewise, each user 18 may access information in database 34 specifically associated with user 18. It should be understood that while three levels of users are described herein, a greater or smaller number of levels of users may readily be implemented by one of ordinary skill in the art.

Any user, regardless of user role (i.e., top-level user, mid-level user, or bottom-level user) is granted access to system 10 and information in database 34 only upon providing a confirmed identification number and password. According to one embodiment of the invention, system 10 may prompt users to periodically change their password for security purposes.

Access to information in database 34 by personnel at call center 28 may similarly be restricted. For example, individuals at call center 28 may be restricted to all users associated with organization 22 except top-level users. Accordingly, by obtaining an identification number and password from a user, the personnel at call center 28 may obtain access to all account information associated with that user.

Finally, system administrators 36 at information manager 24 have full access to all information within database 34 and the ability to create new accounts, delete accounts, or modify existing accounts via processor 32. According to the above-described feature, system 10 provides a secure, hierarchical account structure to prevent access to information by unauthorized personnel or other types of misuse of system 10.

Product Returns

Figure 2:
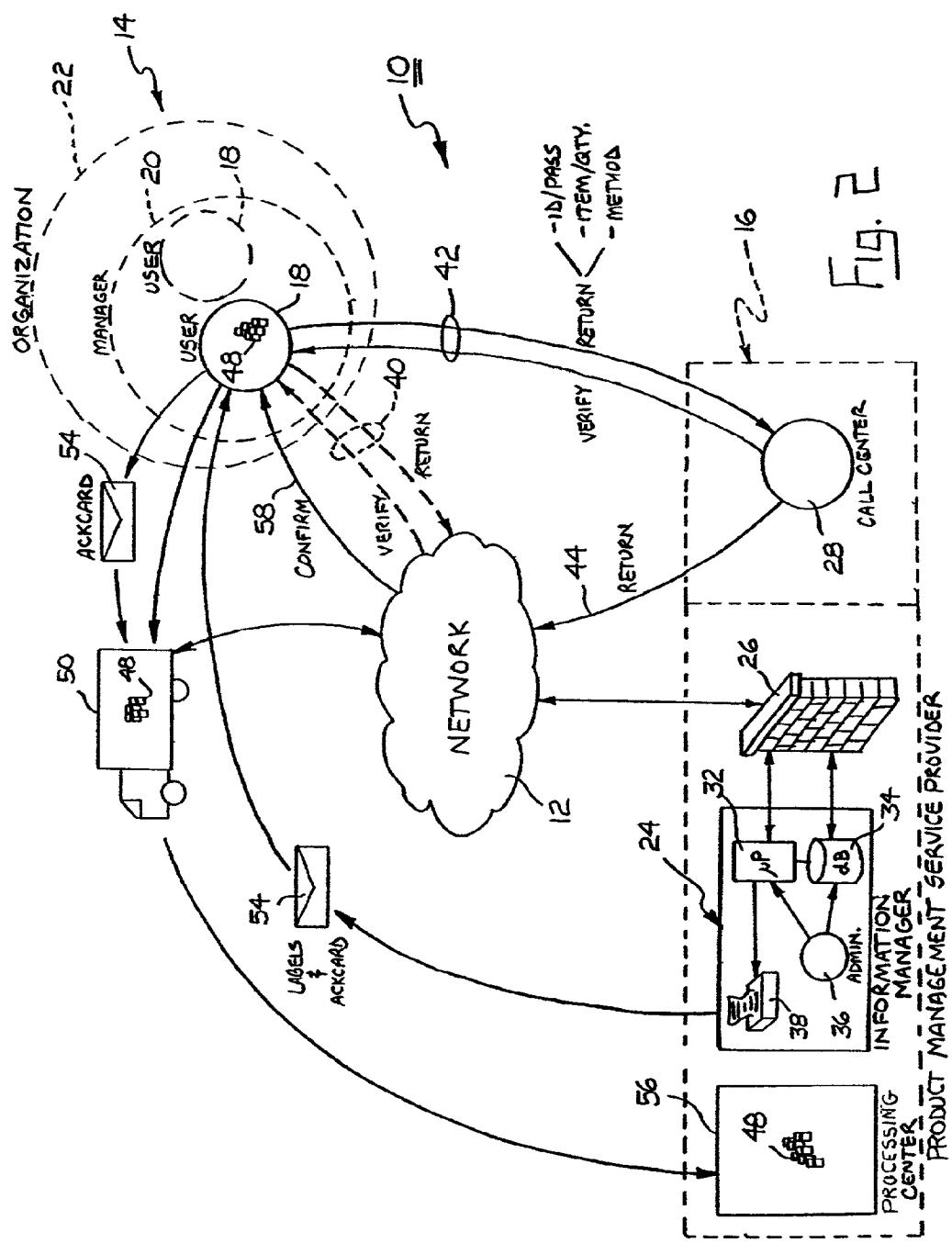
FIG. 2 is a conceptual diagram of a system according to the present invention reflecting the process of placing a return request, processing the return request, and tracking the location of the returned product.

FIG. 2 depicts the product return process. As shown, a user 18 may initiate a product return or return request directly through network 12 via communication link 40 or through call center 28 using telephone link 42. The process of placing the return request is identical to the process of placing a product order as described above. If call center 28 is used, a representative at call center 28 obtains the identification number and password of user 18 to access information in database 34 associated with user 18. The call center personnel verifies the type of product to be returned, the quantity, and the method of shipment. Call center 28 then places the return request over communication link 44. User 18 may directly place the return request by accessing a website on network 12 and providing the required information as described above.

Information manager 24 responds to a return request by providing a confirmation message, for example, via e-mail over network 12 (as indicated by arrow 58.) The return confirmation message includes the description of the product to be returned, the quantity, the method of delivery, and a return tracking number for use by user 18 in tracking the movement of returned product 48 from the return source location (in this example, the location of user 18) to a return processing center 56 within product management service provider 16. It should be noted that the order or return confirmation message indicated by arrow 58 may be, at the option of users within organization 22, sent to recipients in addition to user 18. For example, a mid-level user or manager 20 may request that all order and return confirmation messages be sent to the user 18 initiating the order or return request, and to the mid-level user or manager 20. In this manner, a manager 20 may obtain real-time information reflecting the orders and returns of users 18 under the supervision of manager 20.

Information manager 24 also generates with printer 38 (or an external printing facility) return shipping labels and a return acknowledgement card 54 which are mailed to user 18. Upon receipt of the return shipping labels and the return acknowledgement card, user 18 packages the return product 48 and fills out and signs return acknowledgement card 54. User 18 then provides the returned product 48 and return acknowledgement card 54 to, for example, parcel carrier 50. When parcel carrier 50 scans the return labels of returned product 48, the information associated with returned product 48 is uploaded to a tracking system maintained by parcel carrier 50. Information manager 24 accesses this information and updates database 34 to indicate that returned product 48 has been picked up from user 18.

Returned product 48 is then delivered to the return destination (processing center 56) where the return labels are scanned and return acknowledgement card 54 is obtained. Upon receipt of the signed return acknowledgement card 54, information manager 24 updates database 34 to indicate that returned product 48 has been successfully received at processing center 56. It should be understood that upon updating the product information in database 34 following the receipt of an order at a destination location 14, or following receipt of a return at processing center 56, information manager 24 may generate a new inventory of all products located at the destination location 14 or processing center 56.

Alternatively, system 10 is enabled to permit blank return requests, wherein user 18, by providing a verified identification number and password, may request blank return labels and a blank return acknowledgement card. Information manager causes the generation of the blank labels and acknowledgement card in the manner described above. The materials are mailed to user 18 who then fills out the labels and acknowledgement card. The processing steps of receiving the signed return acknowledgement card and updating database 34 to reflect the return are identical to those described above.

Additionally, system 10 provides for tracking of product from a destination location, such as the address of a user 18, to another destination location. Specifically, a sale representative, for example, may submit a product movement request to system 10 in the manner described above, but specifying that the representative desires to sample a product to a physician or transfer product to another representative. In that case, information manager 24 causes the generation of labels and an acknowledgement card (or generates blank labels and a blank acknowledgement card), and mails the materials to the requesting sales representative. The representative then packages the product, fills out the labels, and sends the product along with the acknowledgement card to the other destination location (e.g., the physician's office). System 10 accesses the tracking system of parcel carrier 50 to determine that the product was picked up at the representative's address. Information manager 24 then updates database 34 to reflect that the product is en route to another destination. The appropriate personnel at the final destination location receive the product, sign the acknowledgement card, and mail it back to service provider 16. Upon receipt of the signed acknowledgement card, information manager 24 updates information in database 34 to reflect the reduction in the product inventory associated with the requesting representative. It should be apparent from the foregoing that product movement requests may also include movement of product from, for example, a physician's office back to a sales representative. This type of return request is processed using the basic steps described above.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. A system for processing product movement requests including orders and returns while maintaining a real-time accounting of product locations, including:

a network;

a first communication link connecting a first location to the network;

a second communication link connecting a second location to the network; and an information manager coupled to the network including a database of product information; wherein in response to a product order from the first location, the information manager sends an order confirmation message over the network to the first location, causes the second location to send an order acknowledgement card and the ordered product to the first location, and updates the database to indicate that the ordered product was received by the first location upon return receipt of the order acknowledgement card, and wherein in response to a request to return product from the first location, the information manager sends a return confirmation message over the network to the first location, sends a return acknowledgement card to the first location, and updates the database to indicate that the returned product was received by the second location upon return receipt of the return acknowledgement card and receipt of the returned product at the second location;

whereby the information manager maintains in the database a confirmed last known location for each product in the system.

2. The system of claim 1 wherein the database includes an identification number and password associated with the first location, and wherein the information manager responds to product movement requests from the first location only upon verifying that an identification number and a password provided by the first location match the identification number and password in the database associated with the first location.

3. The system of claim 1 wherein the order confirmation message includes an order tracking number and the return confirmation message includes a return tracking number.

4. The system of claim 1 further including a third communication link between the information manager and a tracking system of a parcel carrier for shipping ordered and returned products between the first and the second locations, the information manager responding to an input from the tracking system indicating that product has been picked up for shipment between the first and the second location by updating the database to indicate that the picked up product is en route to a different location.

5. The system of claim 1 further including a printing facility for generating the acknowledgement cards, order labels to accompany the ordered product from the second location to the first location, and return labels to accompany the return product from the first location to the second location.

6. The system of claim 5 wherein the order labels include an order tracking number and the return labels include a return tracking number.

7. The system of claim 1 further including a printing facility at the second location, the information manager sending over the network to the printing facility information required to print order labels to accompany the ordered product from the second location to the first location and to print the order acknowledgement card.

8. The system of claim 1 wherein the order confirmation message is an e-mail sent to both a sales representative at the first location and a manager of the sales representative.

9. The system of claim 1 wherein the information manager further maintains an updated inventory of all products located at the first location.

10. The system of claim 1 wherein the return confirmation message is an e-mail.

11. The system of claim 1, wherein the product order is sent to the information manager over the network.

12. The system of claim 1, wherein the information manager further responds to a product order by updating the database to indicate that the ordered product was sent to the first location.

13. The system of claim 12, wherein the information manager updates the database to indicate that the ordered product was sent to the first location after receiving notification from a parcel carrier that the ordered product was picked up from an order source.

14. The system of claim 1, wherein the return request is sent to the information manager over the network.

15. The system of claim 1, wherein the return request includes an identification number and a password, the information manager responding to the return request by comparing the identification number and password to data stored in the database corresponding to the first location.

16. The system of claim 1, wherein the return confirmation message is an e-mail message including a return tracking number.

17. The system of claim 1, further including a call center to receive product orders and return requests by telephone and to send orders and return requests to the information manager over the network.

18. The system of claim 17, wherein the call center, the information manager, and the second location are all located at a service provider location.

19. The system of claim 17, wherein the call center is configured to verify an identity of the first location.

20. The system of claim 19, wherein the database is configured to prevent access by the call center until the identity of the first location is verified.

21. The system of claim 1, further including a firewall connected between the network and the information manager.

22. The system of claim 1, wherein the database is segregated into a plurality of accounts including a first-level account, a second-level account, and a third-level account, the first-level account including the second-level account, and the second-level account including the third-level account.

23. The system of claim 22, wherein the first location has an associated user role of one of a first-level user, a second-level user, and a third-level user.

24. The system of claim 23, wherein the information manager is configured to restrict access to each account based on the user role of the first location such that a first-level user is granted access to the first-level account, the second-level user is granted access only to the second-level account, and the third-level user is granted access only to the third-level account.

25. The system of claim 1, wherein the network is the internet.

* * * * *